Patented Aug. 9, 1932

1,870,788

UNITED STATES PATENT OFFICE

DOUGLAS FRANK TWISS, OF WYLDE GREEN, FRANK THEODORE PURKIS, OF MOSELEY, AND EDWARD ARTHUR MURPHY, OF WYLDE GREEN, ENGLAND, ASSIGNORS TO DUNLOP RUBBER COMPANY LIMITED, OF BIRMINGHAM, ENGLAND, A CORPORATION OF GREAT BRITAIN

METHOD OF MANUFACTURING RUBBER ARTICLES

No Drawing. Application filed September 17, 1929, Serial No. 393,308, and in Great Britain October 18, 1928.

This invention concerns improvements in the manufacture of rubber articles and is particularly concerned with the manufacture of such articles by the gelling of concentrated aqueous dispersions of rubber or the like vegetable resins.

The object of the invention is the manufacture of articles of rubber by the gelling of latex, the gelling being produced by the heating of latex in which are incorporated small quantities of one or more non-coagulating sustances which decompose or interact by the rise in temperature with the formation of one or more acid coagulants for latex.

According to one form of the invention ammonium persulphate and trioxymethylene are incorporated into concentrated compounded latex having a water content of 10% to 40% in the order of 0.1% of each ingredient. The mixture thus produced is quite stable but on heating such a mixture to 90° C. for a few minutes the mixture gels to a mass which can be dried without loss of shape, although shrinkage naturally occurs.

It is suggested that the mechanism of the process is probably somewhat as follows:—

The ammonium persulphate undergoes on heating reduction to ammonium sulphate and free sulphuric acid, the latter neutralizing or destroying part or all of the protective substances present and thus acts as a coagulating agent. The trioxymethylene reacts with the ammonium persulphate thus aiding its transformation and itself undergoing oxidation to formic acid which is, as is well known, also a coagulating agent for latex.

The concentrated dispersions of rubber or the like vegetable resins may be compounded, preserved, natural or artificial, vulcanized or unvulcanized and such dispersions may also contain such added substances as factice, rubber waste, rubber reclaim, mineral rubber or synthetic rubber, vulcanizing agents accelerators, additional preservatives, dyes and filling materials of the ordinary type as well as such special materials as leather dust, cork dust, fibres, metal dust and colloidal metals. Such dispersions may also have admixed therein such artificial resins as phenol-aldehyde, protein-aldehyde and urea-aldehyde condensation products.

Suitable mixes in the form of aqueous dispersions having a water content of 25% to 30% containing the following ingredients have been found suitable:—

Example I

| | |
|---|---|
| Rubber as latex | 35.0 |
| Sulphur | 2.0 |
| Accelerator | 0.4 |
| Whiting | 13.0 |
| Zinc oxide | 3.0 |
| Barytes | 20.6 |
| Transformer oil | 5.0 |
| Colour | 0.8 |
| Ammonium persulphate | 0.1 |
| Trioxymethylene | 0.1 |
| | 100.0 |

Example II

| | |
|---|---|
| Rubber as latex | 97.0 |
| Sulphur | 2.1 |
| Accelerator | 0.5 |
| Ammonium persulphate | 0.2 |
| Trioxymethylene | 0.2 |

As a modification of the above process ammonium persulphate may be used alone or with the addition of other substances such as formaldehyde, acetaldehyde, paraformaldehyde, paraldehyde and of any other such organic substance of substantially neutral reaction capable of oxidation to an acidic substance or substances; ammonium thiosulphate or ammonium salts of other sulphur acids capable of yielding oxidation products of greater acidity, e. g. dithionate may also be used in conjunction with ammonium persulphate.

An example of a suitable mix wherein ammonium persulphate is used alone is as follows:—

| | |
|---|---|
| Rubber | 81.0 |
| Sulphur | 2.5 |
| Accelerator | 0.4 |
| Silica | 15.3 |
| Ammonium persulphate | 0.8 |
| | 100.0 |

In another form of the invention ammonium thiosulphate or barium thiosulphate may be used in conjunction with some substantially non-coagulating oxidizing agent. Ammonium persulphate has already been mentioned in this connection; neutral salts of per-acids generally and/or hydrogen peroxide can also be used with ammonium thiosulphate to yield acidic reaction products as the result of mutual interaction.

In yet another form the chemical process for the development of acidity may not involve oxidation. Thus ammonium thiosulphate or barium thiosulphate may be used alone or in conjunction with a small proportion of a salt, e. g. lead acetate (in sufficient proportion to cause premature coagulation) which accelerates decomposition of the thiosulphate radical with formation of acidic products.

Various modifications may be made by those skilled in the art without departing from the invention as defined in the appended claims.

What we claim is:

1. A process for the manufacture of rubber articles from concentrated aqueous dispersions of rubber or the like vegetable resins of the kinds hereinbefore specified which consists in gelling by the action of heat the aqueous dispersion aforesaid into which are incorporated for the particular purpose specified one or more non-coagulating substances which decompose or interact by the rise in temperature with the formation of one or more acid coagulants.

2. A process as claimed in claim 1, wherein are incorporated with the aqueous dispersion aforesaid ammonium persulphate and trioxymethylene.

3. A process as claimed in claim 1, wherein are incorporated into concentrated compounded latex having a water content of 10% to 40% ammonium persulphate and trioxymethylene in the order of 0.1% of each ingredient and effecting the gelling of the mixture by heating to 90° C. for a few minutes.

4. A process as claimed in claim 1, wherein is incorporated with the aqueous dispersion aforesaid ammonium persulphate.

5. A process as claimed in claim 1, wherein is incorporated with the aqueous dispersion aforesaid ammonium persulphate and substances of substantially neutral reaction capable of oxidation to an acidic substance or substances.

6. A process as claimed in claim 1, wherein is incorporated with the aqueous dispersions aforesaid ammonium persulphate and an ammonium salt of other sulphur acids capable of yielding oxidation products of greater acidity.

7. A process as claimed in claim 1, wherein is incorporated with the aqueous dispersions aforesaid a thiosulphate and neutral salts of a per-acid.

8. A process as claimed in claim 1, wherein is incorporated with the aqueous dispersions aforesaid a thiosulphate.

9. A process as claimed in claim 1, wherein is incorporated with the aqueous dispersion aforesaid, a thiosulphate and a small quantity of a salt in insufficient portion, to cause premature coagulation, which accelerates decomposition of the thiosulphate radical with formation of acidic products.

10. A composition of matter including latex in which are incorporated small quantities of ammonium persulphate and an organic substance of substantially neutral reaction capable of oxidation to an acidic substance.

11. A composition of matter including latex in which are incorporated small quantities of ammonium persulphate and a substantially non-coagulating reducing agent.

12. A composition of matter including latex in which are incorporated small quantities of ammonium persulphate and trioxymethylene.

13. A composition of matter including latex in which are incorporated small quantities of ammonium thiosulphate and a reagent which accelerates decomposition of the thiosulphate radical with formation of acidic products.

In witness whereof, we have hereunto signed our names.

DOUGLAS FRANK TWISS.
FRANK THEODORE PURKIS.
EDWARD ARTHUR MURPHY.